(12) United States Patent
Kerres et al.

(10) Patent No.: US 7,387,732 B2
(45) Date of Patent: Jun. 17, 2008

(54) ORGANIC-INORGANIC MEMBRANES

(75) Inventors: Jochen Kerres, Ostfildern (DE);
Thomas Häring, Stuttgart (DE)

(73) Assignee: Rima Haring, Stuttgart (DE)

( * ) Notice: Subject to any disclaimer, the term of this patent is extended or adjusted under 35 U.S.C. 154(b) by 0 days.

(21) Appl. No.: 11/300,479

(22) Filed: Dec. 15, 2005

(65) Prior Publication Data

US 2006/0096913 A1    May 11, 2006

Related U.S. Application Data

(63) Continuation of application No. 10/275,113, filed as application No. PCT/EP01/04907 on May 2, 2001, now abandoned.

(30) Foreign Application Priority Data

May 2, 2000 (DE) ................. 100 21 104

(51) Int. Cl.
*B01D 71/68* (2006.01)

(52) U.S. Cl. ............... 210/500.25; 210/500.41; 528/372; 528/394; 528/395

(58) Field of Classification Search ........... 528/372, 528/394, 395, 490; 427/341; 429/249, 251, 429/252; 210/500.25, 500.27, 500.33, 500.41
See application file for complete search history.

(56) References Cited

U.S. PATENT DOCUMENTS

| | | | | |
|---|---|---|---|---|
| 2,416,060 A | * | 2/1947 | McAlevy et al. | 525/54.44 |
| 2,630,398 A | * | 3/1953 | Brooks et al. | 427/370 |
| 2,752,316 A | * | 6/1956 | Bolt et al. | 524/59 |
| 2,914,496 A | * | 11/1959 | Kelly | 525/184 |
| 2,963,382 A | * | 12/1960 | Switzer | 427/157 |
| 2,978,401 A | * | 4/1961 | Hoch et al. | 204/296 |
| 4,775,567 A | * | 10/1988 | Harkness | 428/40.3 |
| 4,866,099 A | * | 9/1989 | Hendy | 521/64 |
| H982 H | * | 11/1991 | Berggren et al. | 156/275.1 |
| 5,389,463 A | * | 2/1995 | Chang et al. | 429/142 |
| 5,401,410 A | * | 3/1995 | Bell et al. | 210/500.41 |

OTHER PUBLICATIONS

Bonnet et al. "Hybrid Organic-Inorganic Membranes for a Medium Temperature Fuel Cell", Mar. 2000, Journal of Materials for Electrochemical Systems, vol. 3, No. 2, pp. 87-92.*
Greso et al. "Chemical modification of a NAFION sulfonyl fluoride precursor via in situ sol-gel reactions", 1997, Polymer, olume 38, No. 6, pp. 1345-1356.*

\* cited by examiner

*Primary Examiner*—David L Sorkin
(74) *Attorney, Agent, or Firm*—Edward C. Kwok; MacPherson Kwok Chen & Heid LLP

(57) ABSTRACT

The invention relates to organic/inorganic hybrid polymer blends and hybrid polymer blend membranes that are composed of: one polymer acid halide containing $SO_2X$, $POX_2$ or COX groups (X=, Cl, Br, I); one elemental or metallic oxide or hydroxide, obtained by the hydrolysis and/or the sol/gel reaction of an elemental and/or organometallic compound during the membrane forming process and/or by subsequently treating the membrane in aqueous acidic, alkaline or neutral electrolytes. The invention further relates to hybrid blends and hybrid blend membranes containing polymers that carry $SO_3H$, $PO_3H_2$ and/or COOH groups, obtained by aqueous, alkaline or acidic hydrolysis of the polymer acid halides contained in the polymer blend or the polymer blend membrane. The invention also relates to methods for producing the inventive hybrid blends and hybrid blend membranes.

6 Claims, No Drawings

ORGANIC-INORGANIC MEMBRANES

CROSS REFERENCE TO RELATED APPLICATIONS

This is a continuation of application Ser. No. 10/275,113, entitled Organic-inorganic Membranes, filed 12 Dec. 2002, now abandoned, which was the national stage of International Application PCT/EP01/04907, filed 2 May 2001, which claims priority to German Application 100 21 104.6, filed 2 May 2000.

BACKGROUND OF THE INVENTION

1. Field of the Invention

The present invention relates to membranes of polymers. In particular, the present invention relates to organic/inorganic hybrid polymer blend membranes.

2. Discussion of the Related Art (State of the Art and its Disadvantages)

The state of the art regarding acid chloride/inorganic hybrid composites is disclosed in the following article: "Chemical modification of a Nafion™ sulfonyl fluoride precursor via in situ sol-gel reactions," by A. J. Greso, R. B. Moore, K. M. Cable, W. L. Jarrett, K. A. Mauritz Polymer 38, 1345-1356 (1997)

Nafion™ sulfonyl fluoride precursor membranes are pre-swollen in perfluorohydrophenanthrene and immersed in 3-aminopropyltriethoxysilane. Thereafter excess silane is washed out with EtOH. Hybrids are formed, in which by hydrolysis of silane and by reaction of silanes with $SO_2F$ groups $SiO_2$ networks partially cross-linked with the polymer are formed in the membrane matrix.

Disadvantage of the described system is that the sol/gel reaction takes place in a preformed membrane and consequently the content of the inorganic polymer phase formed by hydrolysis, of the polymer composite can not be set at will.

Also hybrid systems of nonionic polymers and metallic respectively elemental oxides have been described in the literature:

(a) composites of poly(n-butylmethacrylate) and titanium oxide, made by water vapor hydrolysis of titan alkoxides, which had been added to alcoholic solutions of a poly(n-butylmethacrylate) polymer solution, in the polymer matrix after evaporation of the solvent. This procedure is disclosed in "Novel Poly(n-Butyl Methacrylate)/Titanium Oxide Alloys Produced by the Sol-Gel process for Titanium Alkoxides," by K. A. Mauritz, C. K. Jones, J. Appl. Polym. Sci. 40, 1401-1420 (1990).

(b) composite membranes of polyetherimide and nano-dispersed silicium oxide, made by hydrolysis of TEOS in solutions of polyetherimide Ultem® in NMP by addition of 0.15 M HCl solution. After hydrolysis dense or phase inversed membranes are made from this polymer solution. Compatibility of the inorganic with the organic phase was obtained by extra addition of 3-aminopropyltrimethoxysilane (AS). This procedure is disclosed in "Novel Poly(n-Butyl Methacrylate)/Titanium Oxide Alloys Produced by the Sol-Gel process for Titanium Alkoxides," by K. A. Mauritz, C. K. Jones, J. Appl. Polym. Sci. 40, 1401-1420 (1990

SUMMARY

Subject of the Invention and Object of the Invention

The invention relates to organic/inorganic hybrid polymer blends and hybrid polymer blend membranes that are composed of:
- a polymeric acid halide containing $—SO_2X$, $—POX_2$ or $—COX$ groups (X=F, Cl, Br, I)
- an element oxide or element hydroxide or metal oxide or metal hydroxide, obtained by the hydrolysis and/or the sol/gel reaction of an element organic and/or metal organic compound during the membrane formation process and/or by subsequently treating the membrane in aqueous acidic, alkaline or neutral electrolytes.

The invention further relates to hybrid blends and hybrid blend membranes containing polymers that carry $SO_3H$, $PO_3H_2$ and/or COOH groups, obtained by aqueous, alkaline or acidic hydrolysis of the polymeric acid halides contained in the polymer blend or the polymer blend membrane.

The invention also relates to methods for producing said hybrid blends and hybrid blend membranes.

An object of the invention is to provide composites and composite membranes of polymeric acid halides containing in addition an inorganic element/metal oxide/hydroxide phase, which improves the following membrane properties:
- mechanical stability
- thermal stability
- improved water holding ability even at temperatures of >100° C., which is important in particular for the application in membrane fuel cells in the temperature range of >100° C.

In the process according to the invention organic precursors of element/metal oxides/hydroxides are brought into the polymer solution (alkoxides/esters, acetylacetonates etc).

The formation of the inorganic phase in the ionomer happens after the membrane formation by hydrolysis in acidic, alkaline and/or neutral aqueous environment, whereby optionally at the same time or in another step the polymeric acid halide groups may be hydrolyzed to acid groups.

DETAILED DESCRIPTION OF THE PREFERRED EMBODIMENTS

Surprisingly it has been found, that if zirconium(IV) propylate 70, weight % in 1-propanol, $Zr(OCH_2CH_2CH_3)_4$ is brought into solutions of PSU sulfochloride in tetrahydrofuran, the zirconium(IV) propylate does not hydrolyze in the polymer solution or form a sparingly soluble complex, but is built into the membrane matrix upon evaporation of the solvent. If the zirconium(IV) propylate solution in propanol would be mixed with a solution of PSU sulfochloride (or PSU sulfonic acid or PSU sulfonic acid salt) in a dipolar aprotic solvent like N-methylpyrrolidinone, zirconium(IV) propylate would immediately hydrolyze or precipitate. Surprisingly it has been found, that the organic Zr compound can be hydrolyzed by successive posttreatment of the membrane in aqueous lye and/or water and/or acid to zirconium dioxide or zirconium oxide hydroxide nanodispersed in the membrane matrix. The inorganic zirconium compound can be detected by EDX in the membrane matrix. Also other organometallic compounds like $Ti(acac)_2(OiPr)_2$ can be mixed with PSU sulfochloride solutions in ether solvents without hydrolysis in the polymer solution and built into the membrane matrix upon evaporation of the solvent.

The following composites according to the invention can be made. Composite with

- at least one polymeric acid halide with —$SO_2X$, —$POX_2$ or —COX groups, whereby X means F, Cl, Br or I, preferably with an aryl main chain polymer backbone and
- at least one salt, element oxide or element hydroxide or metal oxide or metal hydroxide, obtained by hydrolysis of the following classes of element organic and/or metal organic compounds:
  - metal/element alkoxides/esters of Ti, Zr, Sn, Si, B, Al
  - metal acetylacetonates, e.g. Ti(acac)$_4$, Zr(acac)$_4$
  - mixed compounds of metal/element alkoxides and metal acetylacetonates, e.g. Ti(acac)$_2$(OiPr)$_2$ etc.
  - organic amino compounds of Ti, Zr, Sn, Si, B, Al during the membrane formation process and/or by posttreatment of the membrane in aqueous acidic, alkaline or neutral electrolytes. By the same posttreatment step or by another aqueous acidic, alkaline or neutral posttreatment step the acid halide groups can be thereby optionally hydrolyzed to the corresponding acid groups, to obtain ionomer (blend) membranes with an additional nanodisperse distributed inorganic phase.

The following solvents can be used to prepare the membranes according to the invention: dipolar-aprotic solvents such as N-methylpyrrolidinone (NMP), N,N-dimethylacetamide (DMAc), N,N-dimethylformamide (DMF), dimethylsulfoxide (DMSO) or sulfolane or ether solvents such as tetrahydrofuran, dioxan, glyme, diglyme, triglyme.

Due to the inorganic phase nanodisperse distributed in the membrane matrix, brought in according to the invention, the profile of properties of acid halide polymer (blends) or proton conducting ionomer (blends) and ionomer (blend) membranes is strongly changed. The proton conductivity rises, whereas the swelling does not increase correspondingly as usual.

Depending on the content and the nature of the nanodispersed distributed component the permselectivity of the membranes changes also for nonionic permeating molecules (e.g. gases).

If the hydrolysis is made in phosphoric acid or if a further posttreatment of the membranes with phosphoric acid is made after the hydrolysis, the corresponding metal or element phosphates or hydrogen phosphates or dihydrogen phosphates are generated, which on their part contribute to the proton conductivity.

EXAMPLES

1. Preparation of Ionomer Blend Membrane TH785

0.5 g of PSU sulfochloride with about 1 sulfochloride group per repeating unit are dissolved in 3 g THF. Hereafter 0.5307 g of a 70 weight % solution of zirconium(IV). propylate in 1-propanol are added. The solution is degassed and is cast thereafter into a Petri dish. The solvent is evaporated at room temperature overnight. After that the formed membrane is posttreated as follows:

(1) in 10% NaOH at 80° C. for 24 h (2) in 10% sulfuric acid at 80° C. for 24 h (3) in water at 85° C. for 16 h Characterization Results:

| | |
|---|---|
| IEC [meq $SO_3H/g$]: | 0.77 |
| swelling [%]: | 30.9 |
| $R_{sp}^{H+}$ (0.5 N HCl) [$\Omega$ cm]: | 28.9 |

2. Preparation of Ionomer Blend Membrane TH782

0.5 g of PSU sulfochloride with about 1 sulfochloride group per repeating unit are dissolved in 2.5 g THE. Hereafter 0.8817 g of a 75 weight % solution of titanium (IV) bis(acetylacetonato) diisopropylate in 2-propanol are added. The solution is degassed and is cast thereafter into a Petri dish. The solvent is evaporated at room temperature overnight. After that the formed membrane is posttreated as follows:

(1) in 10% NaOH at 80° C. for 24 h (2) in 10% sulfuric acid at 80° C. for 24 h (3) in water at 85° C. for 16 h Characterization Results:

| | |
|---|---|
| IEC [meq $SO_3H/g$]: | 0.81 |
| swelling [%]: | 39.4 |
| $R_{sp}^{H+}$ (0.5 N HCl) [$\Omega$ cm]: | 12 |

NOVELTY OF THE INVENTION

The new inorganic/organic hybrid ionomer (blend) membranes according to the invention and the methods for producing them have not been described to my knowledge in the literature, neither by own nor by other publications.

ADVANTAGES OF THE INVENTION

The new inorganic/organic hybrid membranes according to the invention show an excellent profile of properties:

good proton conductivity good thermal stability good mechanical stability limited swelling.

Some membranes according to the invention show, caused by the inorganic oxide/hydroxide in the membrane matrix, an improved water holding ability especially at T>80° C. It is supposed, that the nanodispersion of the inorganic component in the membrane is the reason behind. By mixing of oxide powders into ionomer membranes, as has been proposed in some publications[1] already, such a fine distribution of the inorganic component in the membrane matrix as with the method according to the invention can not be reached, where the element—organic/metal organic compounds are hydrolyzed only in the membrane matrix to the oxide or (hydrogen) phosphate. Depending on the specific composition the membranes according to the invention show further advantages:

[1] Comparison of Ethanol and Methanol Oxidation in a Liquid-Feed Solid Polymer Electrolyte Fuel Cell at High Temperature, A. S. Arico, P. Creri, P. L. Antonucci, V. Antonucci, Electochem Sol. St. Lett. 182) 66-68 (1998)

- reduced methanol permeability
- contribution to proton conductivity, especially at T>80° C.
- changed permselectivity, of both charged and uncharged particles
- the membranes are photochemically active, especially those with nanodispersed titanium dioxide
- special compositions (with titanium dioxide) show photoluminescence

KEYWORDS aryl main chain polymers sol/gel process hydrolysis metal and element alkoxides of Ti, Zr, Sn, Si, B, Al metal and element acetylacetonates $Ti(acac)_4$, $Zr(acac)_4$ mixed compounds of metal/element alkoxides and metal acetylacetonates $Ti(acac)_2(OiPr)_2$ organic amino compounds of Ti, Zr, Sn, Si, B, Al element oxides metal oxides element hydroxides metal hydroxides water-containing oxides water-containing phosphates water holding ability proton conductivity polysulfone Udel® polyether ether ketone Victrex®.

polymeric acid halides cation exchange polymers cation exchange polymer membranes polymer proton conductor proton self conductivity membrane fuel cells $H_2$ fuel cells direct methanol fuel cells membranes membrane process Application temperature >80° C.

thermal stability

The invention claimed is:

1. Process for preparing a membrane comprising providing a polymer solution by mixing in a solvent at least one polymeric acid halide with $SO_2X$, $POX_2$, $COX$ or $BX_2$ groups where X=F, Cl, Br, or I, and at least one metal organic or element organic compound selected from the group consisting of metal/element alkoxides/esters of Ti, Zr, Sn, Si, B, or Al, metal acetylacetonates, mixed compounds of metal/elemental alkoxides and metal acetylacetonates, and/or organic amino compounds of Ti, Zr, Sn, Si, B, or Al; wherein said solvent is selected from N-methylpyrrolidinone (NMP), N,N-dimethylacetamide (DMAc), N,N-dimethylformamide (DMF), dimethylsulfoxide (DMSO), sulfolane, tetrahydrofuran, dioxan, glyme, diglyme, or triglyme.

2. Process according to claim 1 wherein the at least one polymeric acid halide is an aryl main chain polymer including the $SO_2X$, $POX_2$, $COX$ or $BX_2$ groups and is selected from the group consisting of polyether sulfones, polysulfones, polyphenyl sulfones, polyether ether sulfones, polyether ketones, polyether ether ketones, polyphenylene ethers, polydiphenylphenylene ethers, polyphenylene sulfides or is a copolymer thereof.

3. Process according to claim 1, wherein the groups $SO_2X$, $POX_2$, $COX$ or $BX_2$ of the polymeric acid halide are converted by hydrolysis to $SO_3Y$, $PO_3Y_2$, $COOY$ or $B(OY)$, groups where Y is selected from H, a univalent or bivalent metal cation, ammonium ion, imidazolium ion, pyrazolium ion, or pyridinium ion.

4. Process according to claim 1, wherein the polymer solution is cast into a thin film on a support, and the solvent is evaporated at a temperature of 80° C. to 150° C. at normal pressure or under vacuum.

5. Process according to claim 4, wherein said support is a glass plate, metal plate, tissue, woven material, non-woven material, fleece, porous membrane or polymer membrane.

6. Process according to claim 4, wherein the thin film is post-treated as follows, whereby order of steps can vary and steps (1) and/or (2) and/or (3) are optional: (1) in water at a temperature of 50° C. to 100° C., (2) in 1 to 100% mineral acid, hydrohalic acid, sulfuric acid, or phosphoric acid at a temperature of 50° C. to 100° C., and/or (3) in 1 to 50% aqueous base or in an anhydrous liquid amine or mixture of different amines.

* * * * *